United States Patent Office 2,867,601
Patented Jan. 6, 1959

2,867,601

GRAFT COPOLYMER OF UNSATURATED MONOMER AND COPOLYMER OF FLUORINATED OLEFIN AND PERMALEIC ACID AND PROCESS OF PREPARING SAME

Billy F. Landrum, Belleville, and Ralph L. Herbst, Jr., Westfield, N. J., assignors, by mesne assignments, to Minnesota Mining and Manufacturing Company, St. Paul, Minn., a corporation of Delaware No Drawing. Original application November 29, 1954, Serial No. 471,913. Divided and this application July 7, 1958, Serial No. 751,587

7 Claims. (Cl. 260—45.5)

This invention relates to novel copolymers of polymerizable ethylenically unsaturated compounds containing a least two fluorine atoms, and permaleic acid.

The physical nature of the copolymer products of polymerizable ethylenically unsaturated compounds containing at least two fluorine atoms, and permaleic acid varies from oils and waxes to higher molecular weight thermoplastics, depending upon the ratio of comonomers employed and the polymerization conditions.

Among the polymerizable ethylenically unsaturated compounds which may be employed are perfluoroethylene, chlorotrifluoroethylene, 1,1-difluoro-2,2-dichloroethylene, 1,2-difluoro-1,2-dichloroethylene, trifluoroethylene, 1,1-difluoroethylene, 1,2-difluoroethylene, 1,1-difluoro-2-chloroethylene, bromotrifluoroethylene, trifluoropropenes, such as 3,3,3-trifluoropropene-1, fluorinated butenes, amylenes, and the like, containing at least two fluorine atoms, such as 1,2,3,4-tetrafluorobutene-1 and 1,2,3,4-tetrafluoroamylene-1, perfluoropropene, perfluoroisobutene, perfluorocyclobutene, trichlorotrifluoropropene, and chloropentafluoropropene. The polymerizable ethylenically unsaturated compound containing at least two fluorine atoms contains no halogen atoms other than fluorine, chlorine, and bromine.

Sufficient permaleic acid should be employed to introduce sites for cross-linking in the polymer chain, and as little as about 0.001 part by weight per 100 parts by weight of polymerizable ethylenically unsaturated compound may be employed. The permaleic acid may also be employed in a concentration as high as 100 parts by weight per 100 parts by weight of polymerizable ethylenically unsaturated compound, to produce 1:1 copolymers. Preferably, the permaleic acid is employed in a concentration of about 0.5 part to 5 parts by weight per 100 parts by weight of polymerizable ethylenically unsaturated compound. Using no more than 5 parts of permaleic acid per 100 parts of polymerizable ethylenically unsaturated compound produces copolymers containing a high percentage of halogen, which is desirable since the thermal and chemical stability of the copolymer product when cross-linked increases with increasing halogen content.

The copolymers of this invention are prepared employing various conventional polymerization recipes. The temperatures employed in the copolymerization reaction may be between about −20 to +80° C., with the preferred temperature range being 20 to 60° C. The polymerization may be conducted for a period of 5 hours to one week, and preferably, for a period of 20 to 30 hours. The pressure may be between 50 and 1000 p. s. i. g., the higher pressures being obtained by pressuring the system with an inert gas, if desired. Preferably, autogenous pressures in the range of 50 to 350 p. s. i. g. are employed.

Any one of a number of free radical promoted polymerization systems may be employed to produce the copolymers of the invention, and peroxy type polymerization promoters have been found suitable in initiating the desired polymerization reaction and are used in suspension, emulsion, mass, or solution polymerization systems. The permaleic acid also functions as a promoter as well as a comonomer.

Of the water suspension type catalyst systems which may be employed, a redox catalyst system, which comprises an oxidant and a reductant is preferred. The oxidant in the water suspension type recipe is preferably an inorganic persulfate, such as potassium persulfate, sodium persulfate, or ammonium persulfate. The reductant is preferably a bisulfite, such as potassium bisulfite, sodium bisulfite, potassium metabisulfite, or sodium metabisulfite. The oxidant in the suspension redox recipe comprises between about 0.1 and 5 parts by weight per 100 parts of total comonomers present, and preferably comprises between about 0.5 and 2 parts by weight per 100 parts of total comonomers present. The reductant, for example sodium metabisulfite, may comprise between about 0.05 and about 5.0 parts by weight per 100 parts of total comonomers present and preferably comprises between about 0.1 and about 2 parts by weight per 100 parts of total comonomers present. A buffer, such as sodium tetraborate or disodium hydrogen orthophosphate, may also be employed, if desired, together with the oxidant and reductant.

Also, about 0.01 to about 1 part by weight, per 100 parts of total comonomers present, of a variable valence metal salt may be used. The variable valence metal salt is preferably an iron salt, such as ferrous sulfate or ferrous nitrate, and it is used as an activator. When producing the copolymers of the invention in the persulfate-bisulfite suspension system, it is preferable to operate at a temperature range of about 25° C. to about 60° C., but lower temperatures, i. e., between about 5° C. and about 25° C., are desirably employed when a variable valence metal salt is present in the polymerization system. Also, the reductant and variable valence metal salt may be eliminated, if desired, and a water suspension recipe may be used which contains only the oxidant.

Alternatively, an emulsion catalyst system, containing water, soap, and a peroxy compound, may also be used. The different types of emulsion systems may be conveniently differentiated on the basis of the catalyst system used to initiate the polymerization. One type is that in which the polymerization is initiated by employing a redox catalyst system, comprising between about 0.01 to about 1 part by weight per 100 parts of total comonomers present, of an organic oxidant and an activator solution. Exemplary of the organic oxidants which may be used in the emulsion catalyst system are tertiary-butyl perbenzoate, tertiary-butyl hydroperoxide, and di-tertiary-butyl peroxide. A typical activator solution may consist of about 0.01 to 1.0 part by weight, per 100 parts of total comonomers present, of a variable valence metal salt, for example, ferrous sulfate; about 0.1 to 10.0 parts by weight of sodium pyrophosphate; and about 0.1 to 10.0 parts by weight of a reducing sugar, such as dextrose, fructose, or levulose.

Another type of emulsion catalyst system is that which comprises about 0.05 to 5 parts by weight, per 100 parts of total comonomers present, of a persulfate as the oxidant, and which preferably comprises between about 0.1 and about 0.5 part by weight of any of the persulfates previously mentioned as being suitable for use in aqueous suspension systems.

The soap employed as the emulsifying agent in either the redox or persulfate emulsion catalyst system is preferably a metal salt, such as the potassium or sodium salts derived from saturated aliphatic acids, having a chain length between about 14 to 20 carbon atoms, or from polyfluorocarboxylic acids or perfluorochlorocarboxylic acids. The polyfluorocarboxylic acids which may be used are those disclosed in U. S. Patent 2,559,752, and the derivatives of the acids disclosed therein as being efficacious dispersing agents in polymerization reactions may also be employed in the process of the present invention. The perfluorochlorocarboxylic acids which may be used in the process of the present invention are those disclosed in copending application Serial No. 463,073, filed October 18, 1954, as being useful as dispersing agents in polymerization reactions. The soap is generally present in a quantity between about 0.5 and about 10 parts by weight per 100 parts of total comonomers present. The emulsion polymerization is desirably conducted under alkaline conditions, and the pH should be maintained between about 9 and 11 in order to prevent gelling of the soap. The pH may be adjusted by the addition of suitable buffers.

Of the organic peroxide promoters which may be used in the mass polymerization system, substituted acetyl peroxides, such as trichloroacetyl peroxide, are preferred. Other suitable organic peroxides are perfluoropropionyl peroxide, difluoroacetyl peroxide, 2,4-dichlorobenzoyl peroxide, chloroacetyl peroxide, trifluorodichloropropionyl peroxide, and dichlorofluoroacetyl peroxide.

In the solution polymerization system, the comonomers may be polymerized, for example, in the presence of trichlorotrifluoroethane and a peroxide promoter such as bis-trichloroacetyl peroxide. These materials are exemplary only of the solvents and promoters which may be used in the solution polymerization system. Among the other solvents which may be employed are trichloromonofluoromethane, perfluorinated carboxylic acids and amines, such as perfluoropropionic acid and perfluorotributyl amine, polyhalogenated saturated alkanes, such as 1,1-difluoro-1,2-dichloroethane, and various cotelomer oils. Other organic peroxide promoters which may be used are those listed above as being suitable for use in the mass polymerization system.

Polymerization modifiers may be employed to reduce the molecular weight of the copolymer products. Exemplary of such modifiers are chloroform, carbon tetrachloride, trichlorotrifluoroethane, trichloroacetyl chloride, bromotrichloromethane, dodecyl mercaptan, beta-mercaptoethanol, and beta-mercaptopropionic acid. These modifiers may be employed in concentrations of about 0.01 to 100 parts by weight per 100 parts of total comonomers present and are preferably employed in concentrations of about 0.1 to 20 parts by weight per 100 parts of total comonomers present. The lower concentrations of modifier are preferred when mercaptans and halogenated methane type modifiers are used. Certain of the modifiers, such as chloroform and carbon tetrachloride, act as diluents and/or as modifiers, depending upon the quantity used.

The copolymers of the invention may be cross-linked with polyisocyanates, such as para-phenylene diisothiocyanate, triphenylmethane triisocyanate, p-phenylene diisocyanate, p,p'-diisocyantodiphenylmethane, m-tolylene diisocyanate, hexamethylene diisocyanate, ethylene diisocyanate, and phloroglucinol triisocyanate. Cross-linking of the copolymers of the invention produces thermosetting resins, and the cross-linking may be effected by heating the mixture of copolymer and cross-linking agent at a temperature between room temperature and about 200° C. The concentration of cross-linking agent employed will depend upon the quantity of permaleic acid incorporated into the copolymer, which will in turn depend upon the quantity of permaleic acid initially charged. Generally, the concentration of cross-linking agent will be between about 0.01 and 100 parts by weight per 100 parts by weight of copolymer.

Other cross-linking agents which may be employed are glycols, such as ethylene glycol and 1,4-butane diol; polymercaptans such as trimethylene and decamethylene dimercaptan; and compounds such as dimercaptotriethylene glycol.

Additional cross-linking agents which may be used have the formula $$Y-CH_2-(CF_2-CFCl)_n-CH_2-Y$$

in which Y is —NCO, —SH, or —OH and $n$ is an integer from 1 to 20.

The copolymers of polymerizable ethylenically unsaturated compounds containing at least two fluorine atoms and permaleic acid, such as the copolymer of chlorotrifluoroethylene and permaleic acid, may be used for the preparation of graft-type polymers. In this type of polymer a primary monomer or comonomer chain is formed upon which another polymerizable monomer is grafted, the latter monomer forming side chains on the primary polymer or copolymer chain. Exemplary of the monomers which may be grafted on the copolymer chains produced by copolymerizing ethylenically unsaturated compounds such as chlorotrifluoroethylene with permaleic acid are mono-olefinic hydrocarbons, such as ethylene, propylene, isobutylene, and styrene; halogenated compounds, such as alpha, beta, beta-trifluorostyrene, vinyl fluoride, vinyl chloride, and vinyl bromide; vinyl carboxylates, such as vinyl formate, vinyl acetate, vinyl butyrate, and vinyl benzoate and vinyl esters of higher aliphatic carboxylic acids; esters, nitriles, amides, anhydrides, and acid halides of alpha-methylene monocarboxylic acids, such as methyl methacrylate, methyl acrylate, methylalpha-chloroacrylate, methyl-alpha-fluoroacrylate, acrylonitrile, methacrylic amides, methacrylic acid anhydride, and methacrylic acid fluoride; vinyl ethers, such as vinyl ethyl ether and vinyl butyl ether; vinyl ketones, such as vinyl methyl ketone and vinyl phenyl ketone; N-vinyl compounds, such as N-vinyl succinimide, N-vinyl phthalimide, and N-vinyl carbazole; and the esters of vinylene dicarboxylic acids, such as dimethyl fumarate and diethyl fumarate.

The graft-type polymers are produced at temperatures in the range of room temperature to about 175° C., preferably in the range of 90° to 150° C., the higher temperatures being preferred when styrenes or halogenated styrenes are used. The concentration of the monomer to be grafted on to the copolymer may vary from 0.01 to 300 parts by weight or higher per 100 parts by weight of copolymer employed. The graft-type polymers may be produced by heating a mixture of finely divided copolymer in the monomer to be grafted for a period of 0.1 to 90 hours, and more particularly, a slurry of a copolymer in the monomer to be grafted may be refluxed for a period of 0.5 to 50 hours, at a pressure of 30 to 350 p. s. i. g.

The copolymers of polymerizable ethylenically unsaturated compounds containing at least two fluorine atoms and permaleic acid, such as the copolymer of chlorotrifluoroethylene and permaleic acid, are useful as intermediates for the preparation of thermosetting resins.

The thermosetting resins produced by cross-linking the copolymers of the invention, such as that produced by copolymerizing chlorotrifluoroethylene with permaleic acid, are useful as protective coating resins, since they are chemically inert and thermally stable. The technique of applying these resins to a surface does not necessitate fusion or a high temperature technique which is necessary in applying polychlorotrifluoroethylene, for example, as a coating. One example of the use of the thermosetting resins of the invention is as follows: A copolymer of chlorotrifluoroethylene and permaleic acid is dissolved in a low boiling solvent, such as chloroform, carbon tetrachloride, or methylene dichloride, and the article to be coated is placed in the solution, to which a cross-linking agent, such as a polyisocyanate, is added. After the mixture is permitted to stand, with or without heating, the solvent is evaporated with the result that the article is covered with a coating of the resin produced. Using this technique, which is similar to that employed in the application of glyptal resins, very intricate apparatus is easliy coated.

The graft-type polymers produced in accordance with the process of the invention are useful as electrical insulators having low moisture absorption, high heat resistance, high strength, chemical resistance, permanence, and which are non-flammable.

The invention will be further illustrated by reference to the following specific examples, in which all parts are by weight:

EXAMPLE 1

A glass polymerization tube was charged with 0.5 part of permaleic acid and 100 parts of chlorotrifluoroethylene. The tube was sealed and rotated end-over-end for a period of 20 hours in a water bath, the temperature of which was maintained at 50° C. The tube was then vented to atmospheric pressure, and the product was coagulated by freezing in a solid carbon dioxide-acetone bath. The coagulated polymer was collected, washed with water and dried in an oven set at a temperature of 100° C. The product was a powder obtained in 15.4 percent yield.

Following the procedure described above and using 1.0 part of permaleic acid and 100 parts of chlorotrifluoroethylene produced a 25.2 percent yield of product.

EXAMPLE 2

A glass polymerization tube was charged with 1.0 part of permaleic acid, 10 parts of deionized water, and 100 parts of chlorotrifluoroethylene. The tube was sealed and rotated end-over-end for a period of 20 hours in a water bath, the temperature of which was maintained at 50° C. The tube was then vented to atmospheric pressure, and the product was coagulated by freezing in a solid carbon dioxide-acetone bath. The coagulated polymer was collected, washed with water, and dried in an oven set at a temperature of 100° C. The product was a powder, obtained in 8.8 percent yield, having a 0.5 percent solution viscosity, in a 3,5-dichlorobenzotrifluoride solvent, of 0.424 centistoke.

EXAMPLE 3

A glass polymerization tube was charged with 125 parts of deionized water and 125 parts of an aqueous solution containing 2.2 parts of sodium bisulfite. After freezing the contents of the tube in a solid carbon dioxide-acetone bath, 1.0 part of permaleic acid was added. The contents of the tube were refrozen, and the tube was evacuated while connected to a gas transfer system. Thereafter, 100 parts of chlorotrifluoroethylene were flash distilled into the tube. After sealing the tube under vacuum at the temperature of liquid nitrogen, it was rotated end-over-end in a water bath, the temperature of which was automatically controlled at 50° C., and at the end of 20 hours, the tube was frozen in a solid carbon dioxide-acetone bath to coagulate the polymeric product, vented and opened. The coagulated polymer was collected, washed several times with water, and dried to constant weight at 100° C. A waxy product was obtained in 11.6 percent yield and had a 0.5 percent solution viscosity, in a 3,5-dichlorobenzotrifluoride solvent, of 0.486 centistoke.

EXAMPLE 4

A glass polymerization tube was charged with 74.5 parts of chloroform, 2.0 parts of permaleic acid and 100 parts of chlorotrifluoroethylene. The tube was sealed and rotated end-over-end for a period of 20 hours in a water bath, the temperature of which was maintained at 50° C. The tube was then vented to atmospheric pressure and the chloroform was evaporated leaving a waxy product which was washed with water and dried to constant weight in an oven set at a temperature of 100° C. The dried product was a white powder which was analyzed and found to contain 28.70 percent chlorine and 45.46 percent fluorine, corresponding to 93.5 weight percent of combined polychlorotrifluoroethylene. This product had a softening temperature of 181–185° C., a 0.5 percent solution viscosity, in 3,5-dichlorobenzotrifluoride, of 0.395 centistoke, and was soluble in carbon tetrachloride and dichlorobenzotrifluoride at room temperature. The product liberated free iodine from an aqueous solution of potassium iodide, indicating the presence of an —O—O-linkage in the product. The infrared absorption spectrum of the product showed absorption in the —COOH region of the spectrum and no absorption in the —C=C— region. These data indicated that copolymerization had occurred between chlorotrifluoroethylene and permaleic acid to produce a product having the structure:

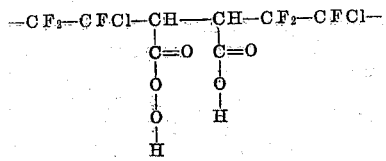

EXAMPLE 5

Cross-linking of $CF_2=CFCl$-permaleic acid copolymer

A mixture containing 100 parts of the permaleic acid-chlorotrifluoroethylene copolymer product of Example 4 above and about 330 parts of a methylene dichloride solution containing 60 parts of triphenylmethanetriisocyanate was allowed to stand for one week at room temperature (about 22° C.) under a nitrogen atmosphere. A solid product was obtained which did not melt at temperatures up to 300° C. The product was insoluble in boiling 3,5-dichlorobenzotrifluoride indicating that cross-linking of the copolymer had occurred.

EXAMPLE 6

Grafting of $CF_2=CFCl$-permaleic acid copolymer with styrene

A slurry consisting of 100 parts of the copolymer product of Example 4 above and 200 parts of freshly distilled styrene was gently refluxed for 1 hour at a temperature between 140° and 150° C. The product which was formed was insoluble in benzene at room temperature, and upon analysis was found to contain 10.97 percent chlorine and 18.10 percent fluorine, corresponding to 36.5 weight percent of combined chlorotrifluoroethylene.

EXAMPLE 7

Copolymer of 3,3,3-trifluoropropene-1 and permaleic acid

A glass polymerization tube is charged as described in Example 3 above with 125 parts of deionized water, 125 parts of an aqueous solution containing 2.2 parts of sodium bisulfite, 1.0 part of permaleic acid and 100 parts of 3,3,3,-trifluoropropene-1. The polymerization reaction is carried out at 50° C. for 20 hours and the polymer product is worked up using the techniques set forth in Example 3 above. A polymer product is obtained which contains combined units of 3,3,3-trifluoropropene-1 and permaleic acid, and shows evidence of an —O—O-linkage.

A mixture containing 100 parts of the permaleic acid-trifluoropropene copolymer is reacted with about 330 parts of a methylene dichloride solution containing 60 parts of triphenylmethanetriisocyanate under the same conditions described in Example 5 above to yield a solid cross-linked product with a higher melting point and increased resistance to swell by organic solvents as compared to the copolymer.

A product which is insoluble in benzene is obtained by reacting 100 parts of the permaleic acid-trifluoropropene copolymer and 100 parts of freshly distilled styrene for 1 hour at a temperature between 140° and 150° C. as described in Example 6 above.

EXAMPLE 8

*Copolymer of vinylidene fluoride and permaleic acid*

A glass polymerization tube is charged as described in Example 3 above with 125 parts of deionized water, 125 parts of an aqueous solution containing 2.2 parts of sodium bisulfite, 1.0 part of permaleic acid and 100 parts of vinylidene fluoride. The polymerization reaction is carried out at 50° C. for 20 hours and the polymer product is worked up using the techniques set forth in Example 3 above. A powdery polymer product is obtained which contains combined units of vinylidene fluoride and permaleic acid, and shows evidence of an —O—O— linkage.

A mixture containing 100 parts of the permaleic acid-vinylidene fluoride copolymer is reacted with about 330 parts of a methylene dichloride solution containing 60 parts of triphenylmethanetriisocyanate under the same conditions described in Example 5 above to yield a solid cross-linked product with a higher melting point and increased resistance to swell by organic solvents as compared to the copolymer.

A product which is insoluble in benzene is obtained by reacting 100 parts of the permaleic acid-vinylidene fluoride copolymer and 100 parts of freshly distilled styrene for 1 hour at a temperature between 140° and 150° C. as described in Example 6 above.

EXAMPLE 9

*Copolymer of 1,1-dichloro-2,2-difluoroethylene and permaleic acid*

A glass polymerization tube is charged as described in Example 4 above with 74.5 parts of chloroform, 2.0 parts of permaleic acid and 100 parts of 1,1-dichloro-2,2-difluoroethylene. The polymerization reaction is carried out at a temperature of 50° C. for 20 hours, and the product is worked up, using the same procedure and techniques set forth in Example 4 above. A powdery product is obtained which contains combined 1,1-dichloro-2,2-difluoroethylene and permaleic acid and shows evidence of an —O—O-linkage. The softening point of this copolymer product is increased by cross-linking with triphenylmethanetriisocyanate as described in Example 5 above.

A slurry consisting of 100 parts of 1,1-dichloro-2,2-difluoroethylene-permaleic acid copolymer product is reacted with 200 parts of freshly distilled alpha,beta,beta-trifluorostyrene by gently refluxing the mixture for 2 hours at a temperature between about 130° and 136° C. to produce an alpha,beta,beta-trifluorostyrene grafted polymer product having a higher softening point than the dichlorodifluoroethylene-permaleic acid copolymer.

EXAMPLE 10

*Copolymer of perfluoroethylene and permaleic acid*

A glass polymerization tube is charged as described in Example 4 above with 74.5 parts of chloroform, 2.0 parts of permaleic acid and 100 parts of perfluoroethylene. The polymerization reaction is carried out at a temperature of 50° C. for 20 hours, and the product is worked up, using the same procedure and techniques set forth in Example 4 above. A powdery product is obtained which contains combined perfluoroethylene and permaleic acid and shows evidence of an —O—O-linkage. The softening point of this copolymer product is increased by cross-linking with triphenylmethanetriisocyanate as described in Example 5 above.

A slurry consisting of 100 parts of perfluoroethylene-permaleic acid copolymer product is reacted with 200 parts of freshly distilled n-butyl acrylate by gently refluxing the mixture for 2 hours at a temperature between about 140° and 150° C. to produce a n-butyl acrylate grafted polymer product having a higher softening point than the perfluoroethylene-permaleic acid copolymer.

EXAMPLE 11

*Copolymer of bromotrifluoroethylene and permaleic acid*

A glass polymerization tube is charged as described in Example 3 above with 125 parts of deionized water, 125 parts of an aqueous solution containing 2.2 parts of sodium bisulfite, 1.0 part of permaleic acid and 100 parts of bromotrifluoroethylene. The polymerization reaction is carried out at 50° C. for 20 hours and the polymer product is worked up using the techniques set forth in Example 3 above. A polymer product is obtained which contains combined units of bromotrifluoroethylene and permaleic acid, and shows evidence of an —O—O-linkage.

A mixture containing 100 parts of the permaleic acid-bromotrifluoroethylene copolymer is reacted with about 330 parts of a methylene dichloride solution containing 60 parts of triphenylmethanetriisocyanate under the same conditions described in Example 5 above to yield a solid cross-linked product with a higher melting point and increased resistance to swell by organic solvents as compared to the copolymer.

A product which is insoluble in benzene is obtained by reacting 100 parts of the permaleic acid-bromotrifluoroethylene copolymer and 100 parts of freshly distilled styrene for 1 hour at a temperature between 140° and 150° C. as described in Example 6 above.

It will be obvious to those skilled in the art that many modifications may be made within the scope of the present invention without departing from the spirit thereof, and the invention includes all such modifications.

We claim:

1. A graft copolymer comprising (A) a copolymer of a halogen substituted monoolefin containing at least two fluorine atoms and containing no halogen other than fluorine, chlorine and bromine, and permaleic acid and (B) an ethylenically unsaturated monomer.

2. A graft copolymer of claim 1 in which the ethylenically unsaturated monomer is styrene.

3. A graft copolymer of claim 1 in which the ethylenically unsaturated monomer is alkyl acrylate.

4. A graft copolymer comprising a (A) copolymer of chlorotrifluoroethylene and permaleic acid and (B) styrene.

5. A process for preparing a graft copolymer which comprises treating a (A) copolymer of a halogen substituted monoolefin containing at least two fluorine atoms and containing no halogen other than fluorine, chlorine and bromine, and permaleic acid with (B) and ethylenically unsaturated monomer at a temperature between about room temperature and about 175° C.

6. A process for preparing a graft copolymer which comprises treating a (A) copolymer of a halogen substituted monoolefin containing at least two fluorine atoms and containing no halogen other than fluorine, chlorine and bromine, and permaleic acid in finely divided form, with (B) an ethylenically unsaturated monomer at an elevated temperature of about 90 to 150° C.

7. A process for preparing a graft copolymer which comprises refluxing a slurry of a (A) copolymer of chlorotrifluoroethylene and permaleic acid in (B) styrene at a temperature between about room temperature and about 175° C.

No references cited.